(12) United States Patent
Lewinson et al.

(10) Patent No.: US 10,520,325 B2
(45) Date of Patent: Dec. 31, 2019

(54) METHOD OF SELECTIVE RIDE-SHARING AMONG MULTIPLE USERS ALONG AN OPTIMIZED TRAVEL ROUTE

(75) Inventors: Tom Lewinson, Ottawa (CA); Sharon Lewinson, Ottawa (CA)

(73) Assignee: RIDESHARK CORPORATION (CA)

( * ) Notice: Subject to any disclaimer, the term of this patent is extended or adjusted under 35 U.S.C. 154(b) by 1827 days.

(21) Appl. No.: 11/735,552

(22) Filed: Apr. 16, 2007

(65) Prior Publication Data

US 2007/0276595 A1  Nov. 29, 2007

Related U.S. Application Data

(60) Provisional application No. 60/803,186, filed on May 25, 2006.

(51) Int. Cl.
*G06Q 10/02* (2012.01)
*G01C 21/34* (2006.01)

(52) U.S. Cl.
CPC ..... *G01C 21/3438* (2013.01); *G01C 21/3484* (2013.01); *G06Q 10/02* (2013.01)

(58) Field of Classification Search
CPC ............... G08G 1/202; G01C 21/3438; G01C 21/3484; G06Q 10/02; G06Q 10/025; G06Q 10/047
USPC ............... 705/6, 13; 701/202, 209
See application file for complete search history.

(56) References Cited

U.S. PATENT DOCUMENTS

| | | | |
|---|---|---|---|
| 4,360,875 A * | 11/1982 | Behnke | 455/456.5 |
| 6,240,360 B1 | 5/2001 | Phelan | |
| 6,459,986 B1 * | 10/2002 | Boyce et al. | 701/202 |
| 6,751,548 B2 | 6/2004 | Fox et al. | |
| 7,080,019 B1 * | 7/2006 | Hurzeler | 705/6 |
| 2001/0056363 A1 * | 12/2001 | Gantz et al. | 705/9 |
| 2003/0014286 A1 * | 1/2003 | Cappellini | G06Q 10/02 705/5 |
| 2003/0100993 A1 * | 5/2003 | Kirshenbaum et al. | 701/202 |
| 2004/0049424 A1 * | 3/2004 | Murray et al. | 705/14 |
| 2004/0249818 A1 * | 12/2004 | Isaac | 707/10 |
| 2005/0049781 A1 * | 3/2005 | Oesterling | 701/207 |
| 2005/0071080 A1 * | 3/2005 | Sano | 701/209 |
| 2006/0059023 A1 * | 3/2006 | Mashinsky | G06Q 10/02 705/5 |

(Continued)

FOREIGN PATENT DOCUMENTS

WO 0131520 A1 5/2001

OTHER PUBLICATIONS

Ronald Fagin and John H. Williams, "A Fair Carpool Scheduling Algorithm," IBM J. Res. Develop, vol. 27, No. 2, (Mar. 1983) (Year: 1983).*

*Primary Examiner* — Kevin H Flynn
*Assistant Examiner* — Emmett K. Walsh
(74) *Attorney, Agent, or Firm* — Burke, Williams & Sorensen, LLP

(57) ABSTRACT

A computer-implementable method and system for identifying the preferred commuting route to be used for a given route requirement subject to travel and personal preference criteria. The method and system uses computerized mapping software programs that match stored travel and user preferences to a given route by matching end points and waypoints along the given route and providing user-enabled filtering among multiple users. The method and system also serve well in finding people whose origin and destination are along the drive route.

22 Claims, 11 Drawing Sheets

(56) References Cited

U.S. PATENT DOCUMENTS

2006/0200306 A1* 9/2006 Adamcyzk .................... 701/200
2006/0253249 A1* 11/2006 Bruelle-Drews ............. 701/209
2007/0143012 A1* 6/2007 Keaveny et al. ............. 701/210
2007/0198276 A1* 8/2007 Hinrichs et al. .................. 705/1
2008/0091342 A1* 4/2008 Assael .......................... 701/202

* cited by examiner

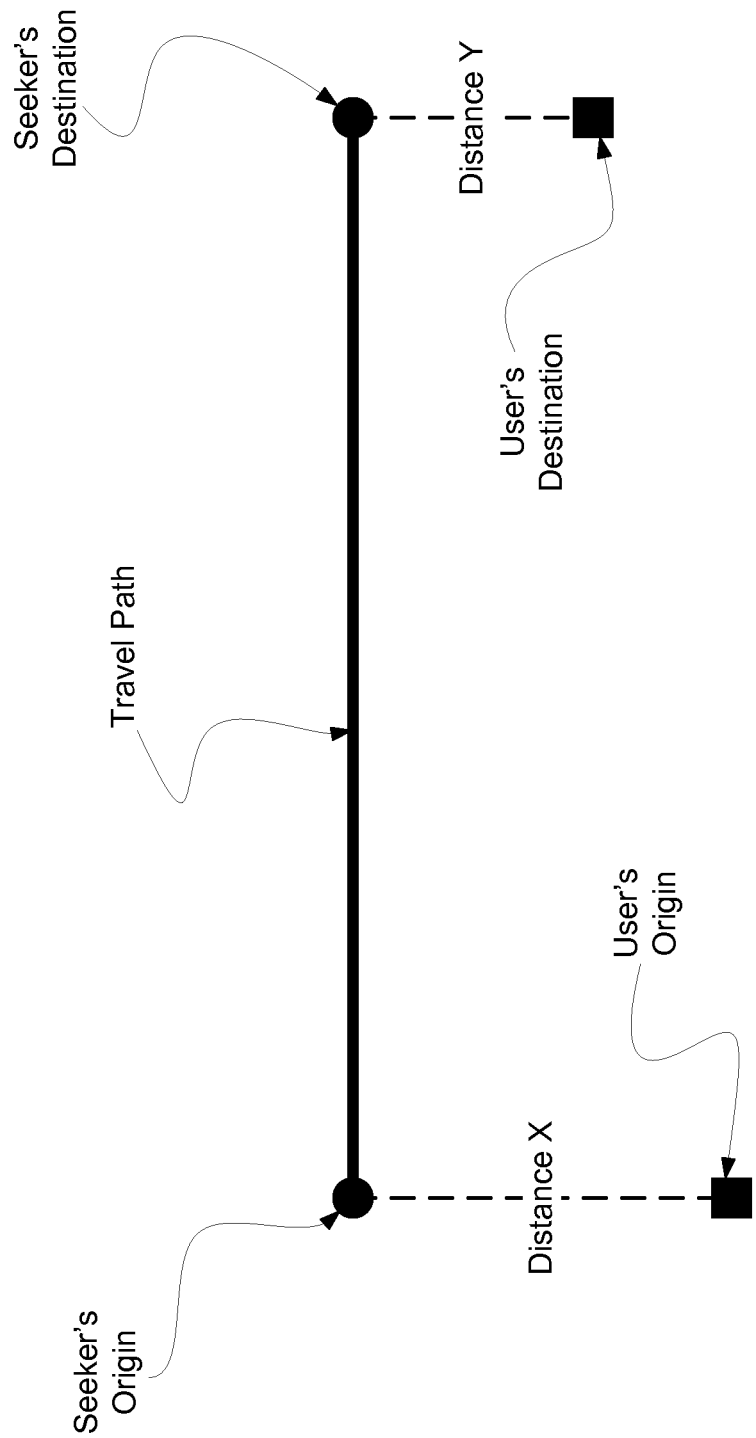

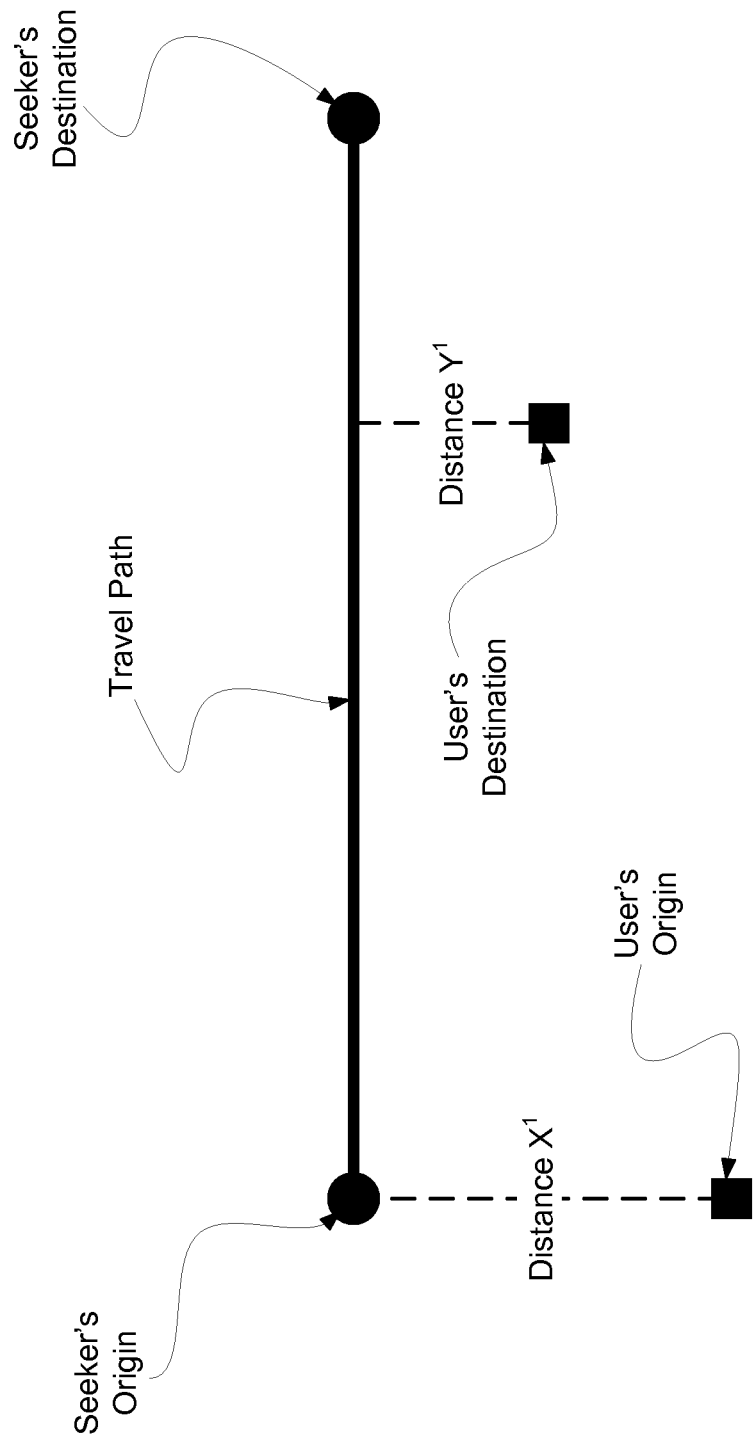

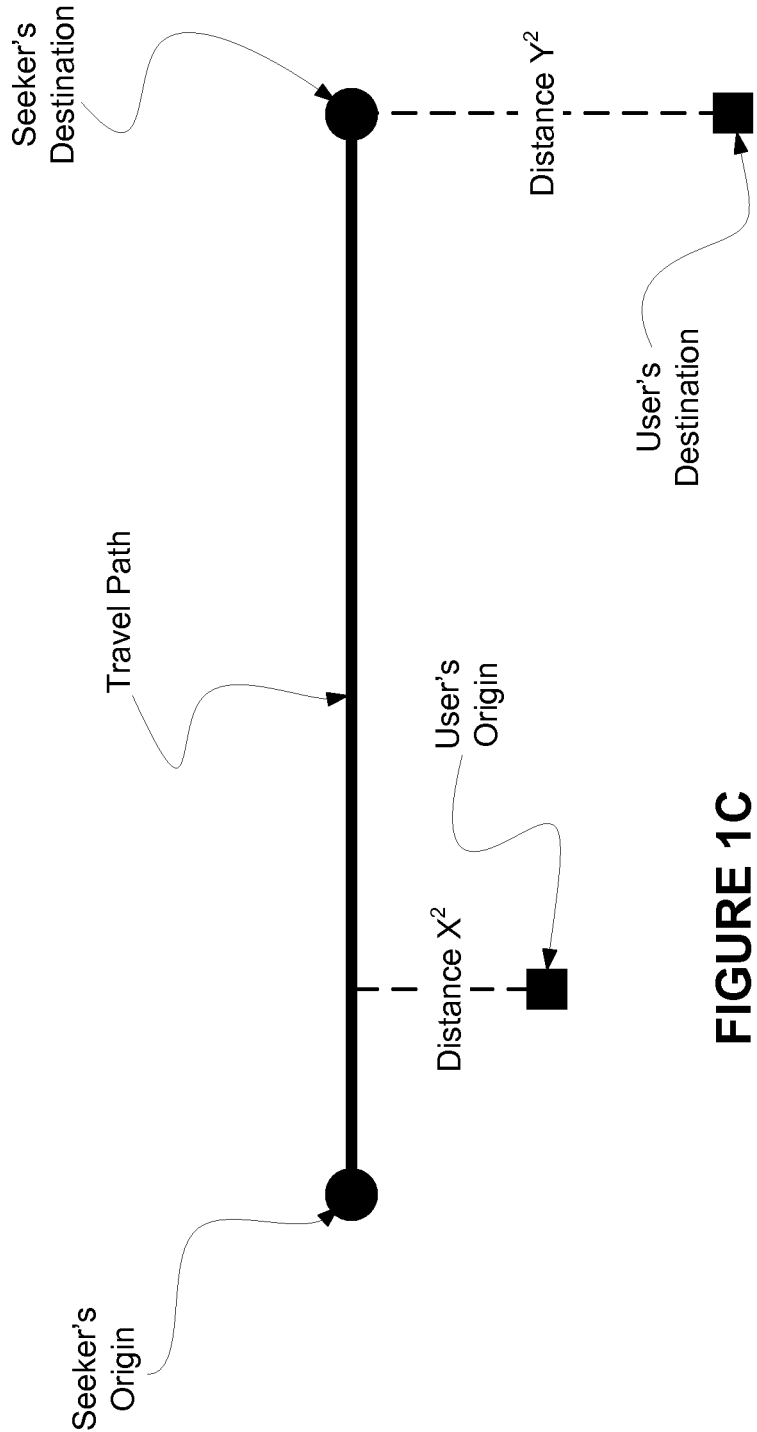

| Name | Description |
|---|---|
| FindNearby | Finds points of interest with a specified distance of a given latitude and longitude coordinate; for example, restaurants within a certain distance of an address. Returns an array of found points of interest ordered by proximity to a selected point, the top score, the number of results found, and the index into the array of results, as a FindResults object. |
| FindNearRoute | Finds points of interest within a specified distance from a route. The found results are returned as a FindResults object. |

FIG. 7

| Name | Description |
|---|---|
| CalculateRoute | Calculates the itinerary of a route and/or the calculated route representation (used to render a highlighted route), based on identified route segments and options. Returns a Route object. |
| CalculateSimpleRoute | Calculates the itinerary of a route based on an array of latitude and longitude |

FIG. 8

METHOD OF SELECTIVE RIDE-SHARING AMONG MULTIPLE USERS ALONG AN OPTIMIZED TRAVEL ROUTE

CROSS REFERENCE TO RELATED APPLICATIONS

The present invention claims priority from U.S. Provisional Patent Application Ser. No. 60/803,186 filed on May 25, 2006.

FIELD OF THE INVENTION

The present invention relates generally to computerized mapping software programs. More particularly, the present invention relates to computerized mapping software programs that match travel and user preferences to a given Travel Route by matching end points and waypoints along the given route and providing user-enabled filtering among multiple users. The method and system also serve well in finding people whose origin and destination are along the drive route.

BACKGROUND OF THE INVENTION

The widespread use of single-occupancy vehicles (SOVs) in modern industrialized societies is known to be a significant cause of several major economic, social and environmental problems including the inefficient use of energy resources, higher than necessary traffic congestion and higher than necessary levels of air pollution.

The alternatives of mass transportation, telecom muting or non-congesting/non-polluting modes of transportation are only available to limited segments of the population. A universal alternative to the use of SOVs is the use of high-occupancy vehicles (HOVs), where multiple individuals share a single vehicle. A system to determine which individuals should share a vehicle must analyze the locations of the origins (e.g., homes) and destinations (e.g., places of work) of all the individuals within its scope and group people together based on how close together they live and work, the departure and arrival times, and the available routes suitable for each individual. Alternatively, people can also be grouped to share a vehicle based on the extent to which all of their origins and destinations lie on a straight line, though this approach is subject to inherent inefficiencies when a diversity of individuals are included.

Several existing products, primarily Internet websites, provide ride-matching services such as the website Carpoolworld. None of the existing products, however, include a complete and maximally efficient ride-matching process.

It is, therefore, desirable to provide a complete and maximally efficient ride-matching process that provides selective ride-sharing among multiple users along an optimized travel route.

SUMMARY OF THE INVENTION

It is an object of the present invention to obviate or mitigate at least one disadvantage of previous software-based carpooling methods.

The present invention provides Internet-based, computerized mapping software programs that match stored travel and user preferences to a given route by matching end points and waypoints along the given route and providing user-enabled filtering among multiple users. This results in full computerization to provide instant automatic results without requiring human intervention. The present invention provides a mechanism for allowing multiple users to ride match in accordance with their Travel Route ("Travel Route" means an optimized or preferred route based on the actual road system and includes the "Start Point, End Point and the path between the two points) and personal preferences. The method and system also serve well in finding people whose origin and destination are along the drive route. As the present invention is Internet-based, it provides the capability to function anywhere on the planet using existing global locating references. The present invention achieves all of the objectives described above by providing a computer-implementable method of storing routes and matching end points and waypoints among multiple users based upon stored travel and personal preferences.

To make the system precise and globally-applicable, it is based on the direct use of standard latitude and longitude coordinates. Several free publicly available resources, including the Internet websites of the United States Geological Survey and the United States Census Bureau, provide latitude and longitude information. Some websites, such as the well-known Google-Maps website, provide geographic information for specific street addresses in the United States, Canada and several European countries, providing latitude and longitude coordinates to a precision of approximately 6 inches. Some websites provide a graphical point-and-click capability to obtain the latitude and longitude coordinates for any point on the planet's surface. Additionally, Global Positioning System (GPS) devices can be obtained by the public that provide latitude and longitude information readings wherever they are used on the planet to a precision of about 30 feet. Additional resources are available in various printed reference resources.

To make the system computationally-efficient, driving routes are stored in a standard relational database management system (RDBMS) using multiple indexes that automatically order the routes simultaneously by end points (i.e., including origin latitude and origin longitude along with corresponding destination latitude and destination longitude). Waypoints (i.e., points along the driving route) may themselves form an end point (either origin or destination).

In a first embodiment, the present invention provides a method, embodied in a computer mapping program, for ride-sharing among multiple users along an optimized travel route, the method including: identifying an origin corresponding to each of two or more users; identifying personal preference criteria related to each of the two or more users; identifying a destination provided by each of the two or more users; correlating the origins and the destinations so as to find matched origins and destinations; determining a matched list of users based upon the origins and the destinations of the two or more users; filtering the matched list of users based upon the personal preference criteria; and determining an optimized travel route corresponding to the origins and destinations related to the matched list of users.

In a further embodiment, there is provided a computer-readable medium having computer executable instructions for identifying an optimized travel route to be used for a given ride-sharing requirement, which when executed, include: identifying an origin corresponding to each of two or more users; identifying personal preference criteria related to each of the two or more users; identifying a destination provided by each of the two or more users; correlating the origins and the destinations so as to find matched origins and destinations; determining a matched list of users based upon the origins and the destinations of the two or more users; filtering the matched list of users based upon the personal preference criteria; and determining an optimized travel route corresponding to the origins and destinations related to the matched list of users.

In further embodiment, the present invention provides an Internet-based system for identifying an optimized travel route to be used for a given ride-sharing requirement, the system including: a means for identifying an origin corresponding to each of two or more users; a means for identifying personal preference criteria related to each of the two or more users; a means for identifying a destination provided by each of the two or more users; a means for correlating the origins and the destinations so as to find matched origins and destinations; a means for determining a matched list of users based upon the origins and the destinations of the two or more users; a means for filtering the matched list of users based upon the personal preference criteria; and a means for determining an optimized travel route corresponding to the origins and destinations related to the matched list of users.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached figures.

FIGS. 1A through 1D are examples of travel filtering as applied by the present invention.

FIG. 7 is a table showing the FindNearRoute and FindNearby methods contained in the FindServiceSoap Class of the MapPoint Web Service®.

FIG. 8 is a table showing the CalculateRoute and CalculateSimpleRoute methods contained in the RouteServiceSoap Class of the MapPoint Web Service®.

DETAILED DESCRIPTION

Figure 1D:
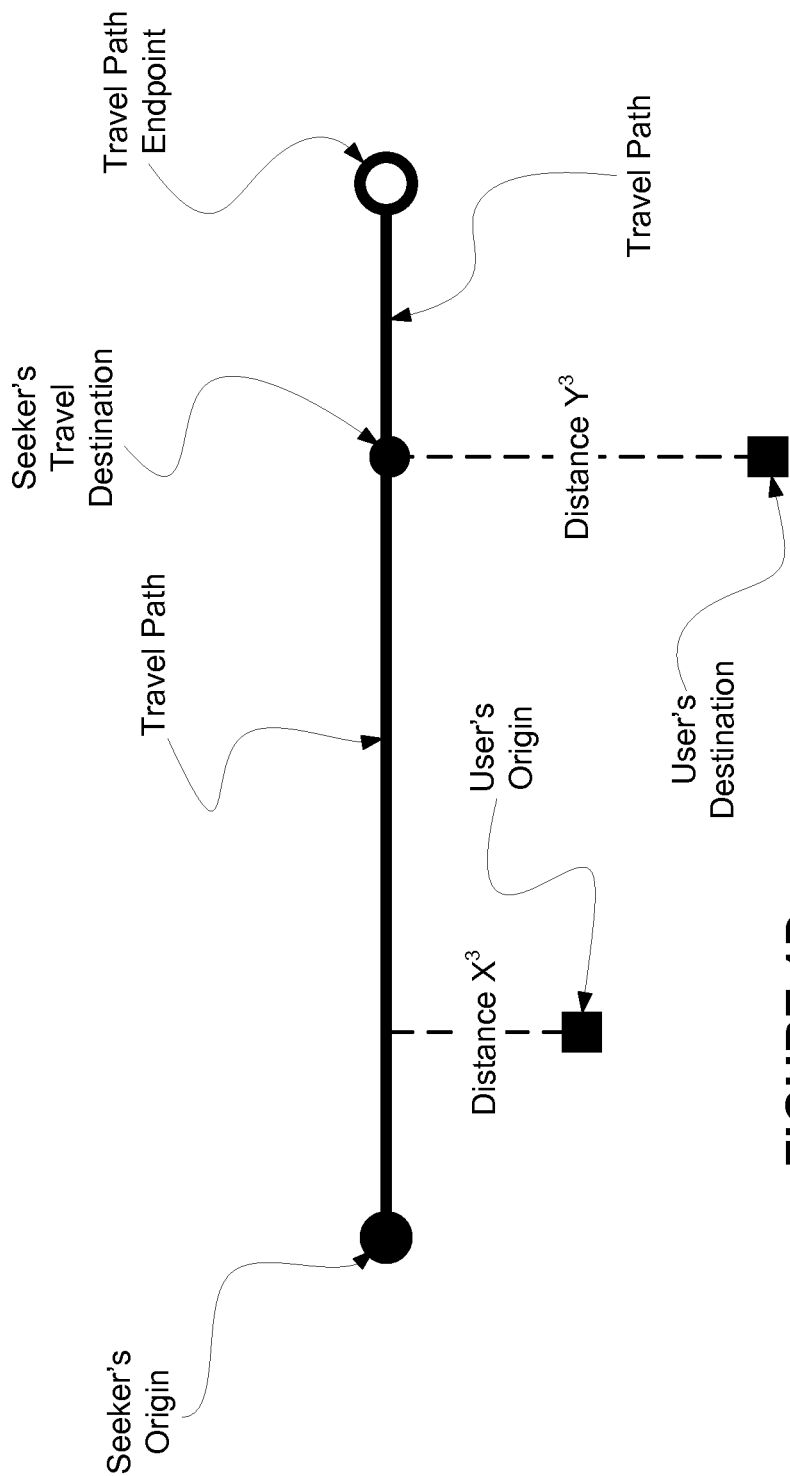

Generally, the present invention provides a method and system for ride matching among multiple diverse users whom have a variety of travel and personal preferences.

The ride matching system is based, without limitation, on the following principles. The present inventive method and system serves to find car pooling partners (2 people) or car pooling groups (more than 2 people) for the purpose of: (1) Sharing transportation costs (benefit to individual); (2) Reducing road congestion (benefit to municipalities and governments); (3) Reducing parking requirements (benefit to organizations who supply parking to their employees); and (4) Reducing toxic and GHG vehicle emissions through a reduction in Total Vehicle km/miles Traveled.

In order to match Car Pool partners/groups it is necessary to match various Personal Preference Filters such as, but not limited to, the user's: (1) Smoking habits; (2) Gender; (3) Desire to be a Drive or Passenger; (4) Travel Schedule and Schedule Flexibility; and (5) various others as appropriate. In addition, it is essential to match individuals/groups with a Travel Route and Travel Schedule that is convenient for all participants. While this patent application deals mainly with the "Travel Route" aspect of matching car pool partners, it should be understood that various alternative aspects may be possible without straying from the intended scope of the present invention.

In terms of the present description, the following terms are all synonymous: (1) Car Pooling, Carpooling; (2) Ride Matching, Ridematching; (3) Ride Sharing, Ridesharing; and (4) Commute Partnering.

In terms of the present description, the following terms are defined:
  i. "Travel Route" means an optimized or preferred route based on the actual road system and includes the start point, end point, and the path between the start and end points.
  ii. A "Seeker" is the individual who is performing the search for Car Pooling Partners.
  iii. "Travel Filters" are Travel Preferences established by the Seeker that allow only desired "Users" to pass through. Travel Preferences may include, but are not limited to, such preferences as time of departure/arrival or highway/local road.
  iv. "Personal Preference Filters" are Personal Preferences established by the Seeker that allow only desired "Users" to pass through. Personal Preferences may include, but are not limited to, such preferences as smoker/non-smoker or gender preference.
  v. "Travel Schedule Filters" are Filters which are strictly concerned with the travel times and days of the week when car pool travel occurs.
  vi. A "User" is a potential Matched User or potential Filtered User before any Travel Filters or Personal Preference Filters have been applied.
  vii. A "Matched User" is a User who passes through the Travel Filters that the Seeker has established, but prior to application of the Personal Preference Filters.
  viii. A "Filtered User" is a User who matches the Personal Preference Filters which the Seeker has established, but prior to application of the Travel Filters.
  ix. A "Filtered Matched User" is a User who passes through both the Travel Filters and the Personal Preference Filters that the Seeker has established.
  x. "Geocoding" is the process of converting a physical address, or a location "indicated on a map by a User" into a Global Latitude-Longitude Coordinate.

As mentioned in terms of the present description, "Travel Route" is defined to be Start Point, End Point and the path between the two points. It should thus be understood that the present invention applies to finding car pool partners along the entire drive route (i.e., the Optimized Travel Route), while prior known methods only match people at the start and the end points, or don't use an "Optimized Travel Route". It should also be understood that an "Optimized Travel Route" is a route that corresponds to the actual person's route rather than simply some geometric representation (such as a straight line in some prior known methods).

The present invention preferably provides for the specific technical processes related to applying Travel Route Filters to Users for the purpose of identifying Matched Users and Filtered Matched Users in the scope of Car Pooling. However, it should be readily apparent to one of ordinary skill in the art of mapping that the present invention indeed has uses, applications, and value outside of carpooling such as any other application using optimized travel routes among multiple users having travel and personal preferences. This may include, without limitation, methods of delivery, trucking, door-to-door sales, marketing, and fundraising.

In accordance with the present invention, Travel Filters can be divided into two sub-Filters including: (1) Travel Schedule Filters and (2) Travel Route Filters. Travel Schedule Filters relate to the time requirements of the given Users such as their work day requires (i.e., 9 AM to 5 PM workday). Applying such Travel Schedule filters is therefore a matter of choosing the proper time windows for commutes into and from work. Travel Route Filters relate to location based requirements in terms of distances between each user with regard to the Travel Route. The Travel Route Filters can be applied in four different ways as shown in FIGS. 1A through 1D and described as follows.

With reference to FIG. 1A, a User and Seeker are illustrated along the Travel Path. It should be understood that the Travel Path is unlikely in reality to be a straight line path, and such is only shown for clarity of illustration. The Travel Route Filters can be applied by Users whose Travel Origin is less than a specified distance X away from the Travel Origin of the Seeker and also whose Travel Destination is less than a specified distance Y away from the Travel Destination of the Seeker. The specified distances X and Y can be either set by the Seeker or be automatically set by the application's logic. It should be readily understood that X and Y may be identical values or may be differing values. For example, the application's logic may set a default for X and Y to be within 0.5 kilometer from the Travel Origin and the Travel Destination, whereas a given Seeker may specify a distance of perhaps 1 kilometer. It should therefore be understood that any combination may be used by a Seeker to customize the specific distances from the Travel Origin or Travel Destination.

With reference to FIG. 1B, a User and Seeker are again illustrated along the Travel Path. In this filtering scenario, the Travel Route Filters can be applied by Users whose Travel Origin is less than a specified distance $X^1$ away from the Travel Origin of the Seeker and also whose Travel Destination is less than a specified distance $Y^1$ away from the Travel Route of the Seeker. As above, the specified distances $X^1$ and $Y^1$ can be either set by the Seeker or be automatically set by the application's logic. Such filtering is useful when the User is dropped off along the Travel Route at a point before the Seeker's Destination.

With reference to FIG. 1C, a User and Seeker are again illustrated along the Travel Path. Here, the Travel Route Filters can be applied by Users whose Travel Origin is less than a specified distance $X^2$ away from the Travel Route of the Seeker and also whose Travel Destination is less than a specified distance $Y^2$ away from the Travel Destination of the Seeker. Still again, the specified distances $X^2$ and $Y^2$ can be either set by the Seeker or be automatically set by the application's logic. Such filtering is useful when the User is picked up along the Travel Route at a point beyond the Seeker's Origin.

With reference to FIG. 1D, a User and Seeker are again illustrated along the Travel Path. In this instance, the Travel Route Filters can be applied by Users whose Travel Origin is less than a specified distance $X^3$ away from the Travel Route of the Seeker and also whose Travel Destination is less than a specified distance $Y^3$ away from a Travel Route Destination of the Seeker. A Travel Route Destination is a destination that is along the Travel Route, but not at the Travel Route endpoint. Yet still again, the specified distances $X^3$ and $Y^3$ can be either set by the Seeker or be automatically set by the application's logic. Such filtering is useful when the User is picked up along the Travel Route at a point beyond the Seeker's Origin and the commuting vehicle used (either the Seeker's or User's vehicle) is utilized by a further user (not shown) to commute further to the Travel Path endpoint.

Figure 2:
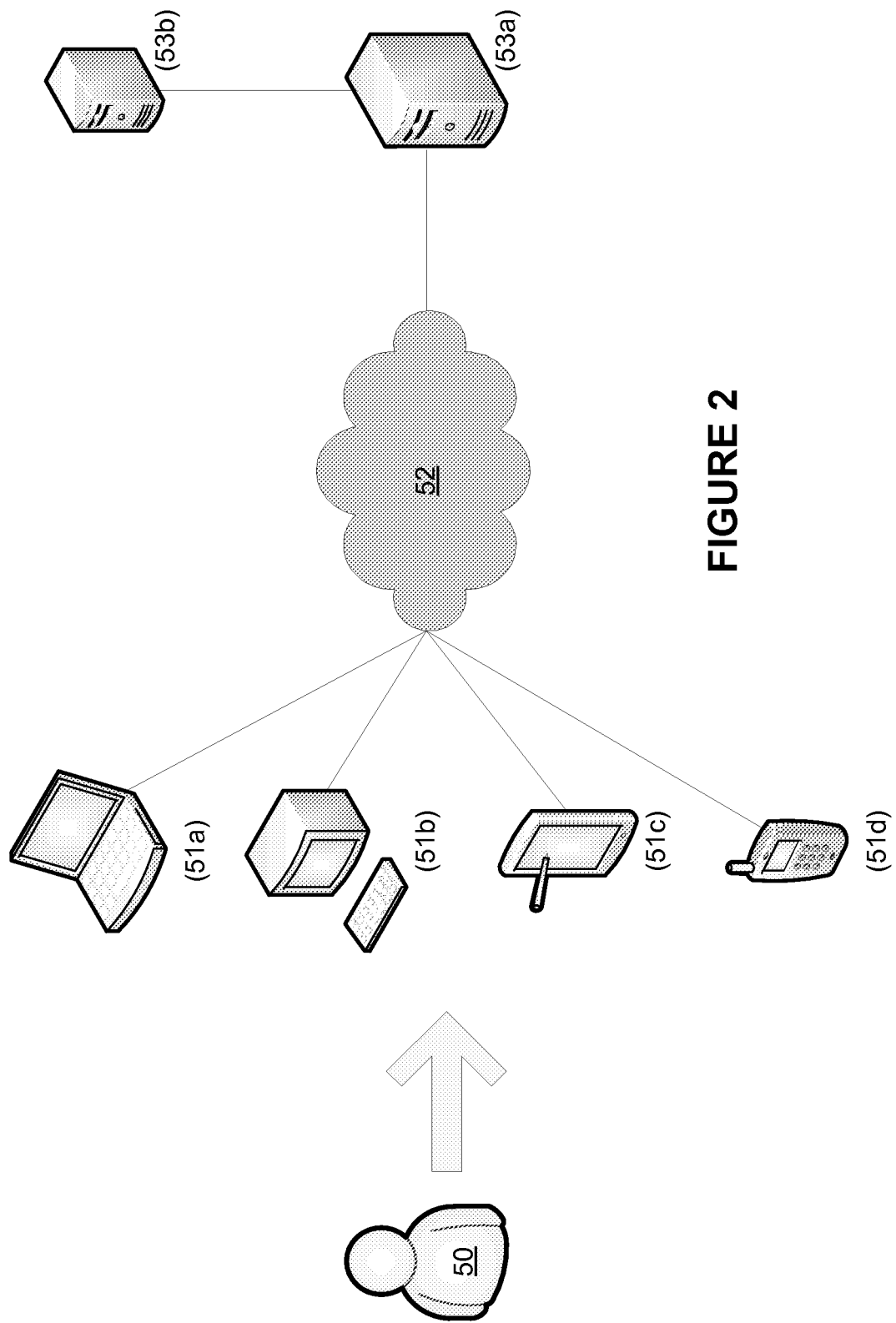
FIG. 2 is a generalized schematic of a user and a network implementing the present invention.

In general, the present invention is used over a network and preferably over the public Internet to allow a maximum amount of users to benefit from commuting. FIG. 2 illustrates to basic components of the present invention. As shown, a user 50 interfaces with the Internet 52 via one of several types of devices including, but not limited to, a laptop 51a, a desktop computer 51b, a personal data assistant 51c, or a smart phone 51d. Such device (51a-51d) is connected in some known manner either wired or wireless to the Internet 52. Similarly connected to the Internet 52 is a server 53a upon which software resides to implement the present invention. One software module in accordance with the present invention is a mapping module (discussed further hereinbelow) that may reside on a separate server 53b as seen in FIG. 2. However, it should be understood that the mapping module may be integrated in such a manner so that servers 53a and 53b may be co-located or otherwise formed as an integral unit (not shown).

Figure 3:
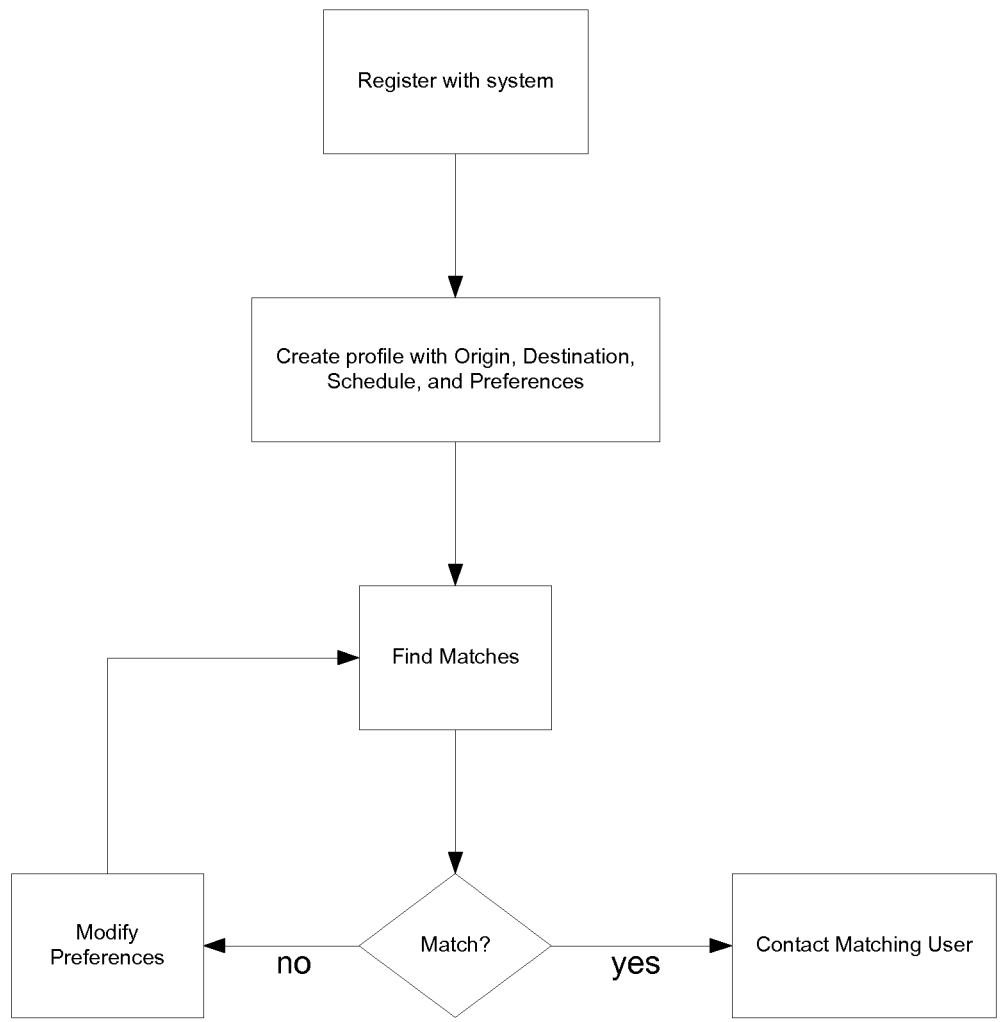
FIG. 3 is a flowchart showing the ride-sharing method in accordance with the present invention.
Figure 4:
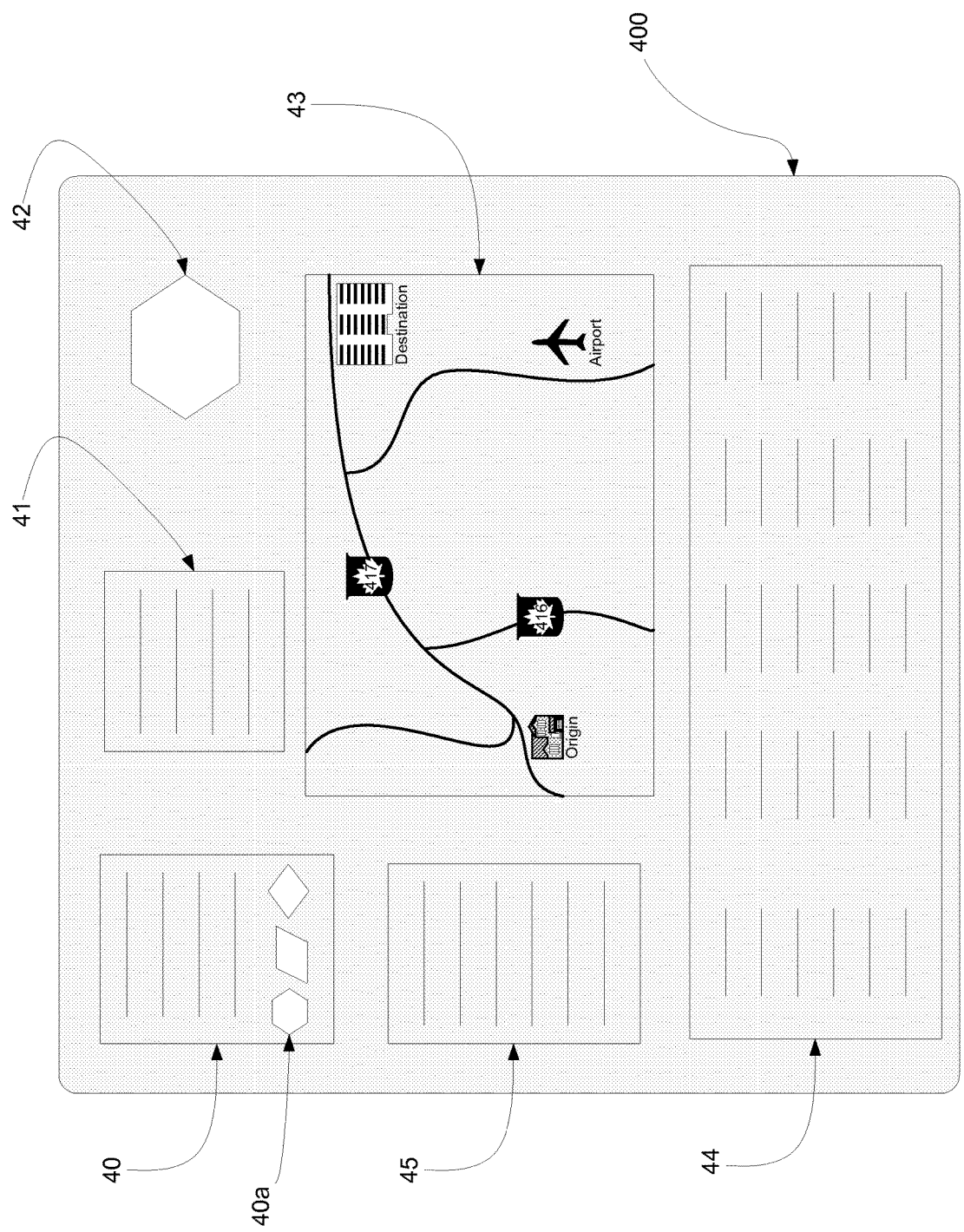
FIGS. 4 through 6 are generalized screenshots of a graphical user interface corresponding to steps shown in FIG. 3 in accordance with the present invention.

In implementing the present invention, a User will perform the method as shown in FIG. 3. Via some interface device as mention above such as a desktop computer, a user will first register with the server embodying the inventive system. Such is accomplished in a normal manner whereby Use data such as name and email address are used to create a user identifier and password. Thereafter, the User creates a profile that includes at least an Origin (usually the User's home), a Destination (usually the User's place of work), their commuting schedule, and their preferences. With additional reference to FIG. 4, the User is presented with a User Profile graphical user interface (Profile GUI) 400 that includes their contact details 40 (e.g., name, phone number, email address) and their profile 40a (e.g., graphically illustrated gender, smoker/non-smoker status, passenger/driver status). The Profile GUI 400 also includes a display of the User's commuting schedule 44 which may include certain items in chart such as day, work start and finish times along with an indication of the flexibility with regard to such start and finish times (e.g., 9:00 AM start plus or minus 20 minutes).

The User's address information 45 is also shown and may include the User's home, Travel Origin (typically same as home), and Travel Destination (typically one's work address). The nearest intersections to the Travel Origin and Travel Destination may also be included in the User's address information 45. The Travel Origin and Travel Destination are also displayed in the Profile GUI 400 as a map 43. The Profile GUI 400 also includes an edit window 41 for editing any of the information shown such as the User's profile, addresses, schedule, or registered login. The Profile GUI 400 includes a Find Match window 42 such that the user may accomplish the next step as shown in FIG. 3 to Find Matches according to the User's profile, addresses, and schedule. In such next step, the User is brought to a Find Matches GUI 500 as shown in FIG. 5.

If no matches are found, then the User is provided with a Find Matches GUI 500 that does not include any matches whereby some message such as "no matches found" would be provided to the User. In such instance, the User may edit their profile via an edit button 51. Alternatively, the User may choose from pull-down menus 53, 56 such filtering criteria such as rider/passenger status, gender, smoker/non-smoker status, distances to origin, home, and destination. Such filtering criteria may then be saved via a save preferences button 52. FIG. 5 as shown includes an instance whereby ride matches a through d are shown in a ride match chart 55. Such ride matches a through d are also shown graphically in the ride match map 54 where a indicates the origin of User A and a indicates the destination of User A and so forth.

Figure 5:
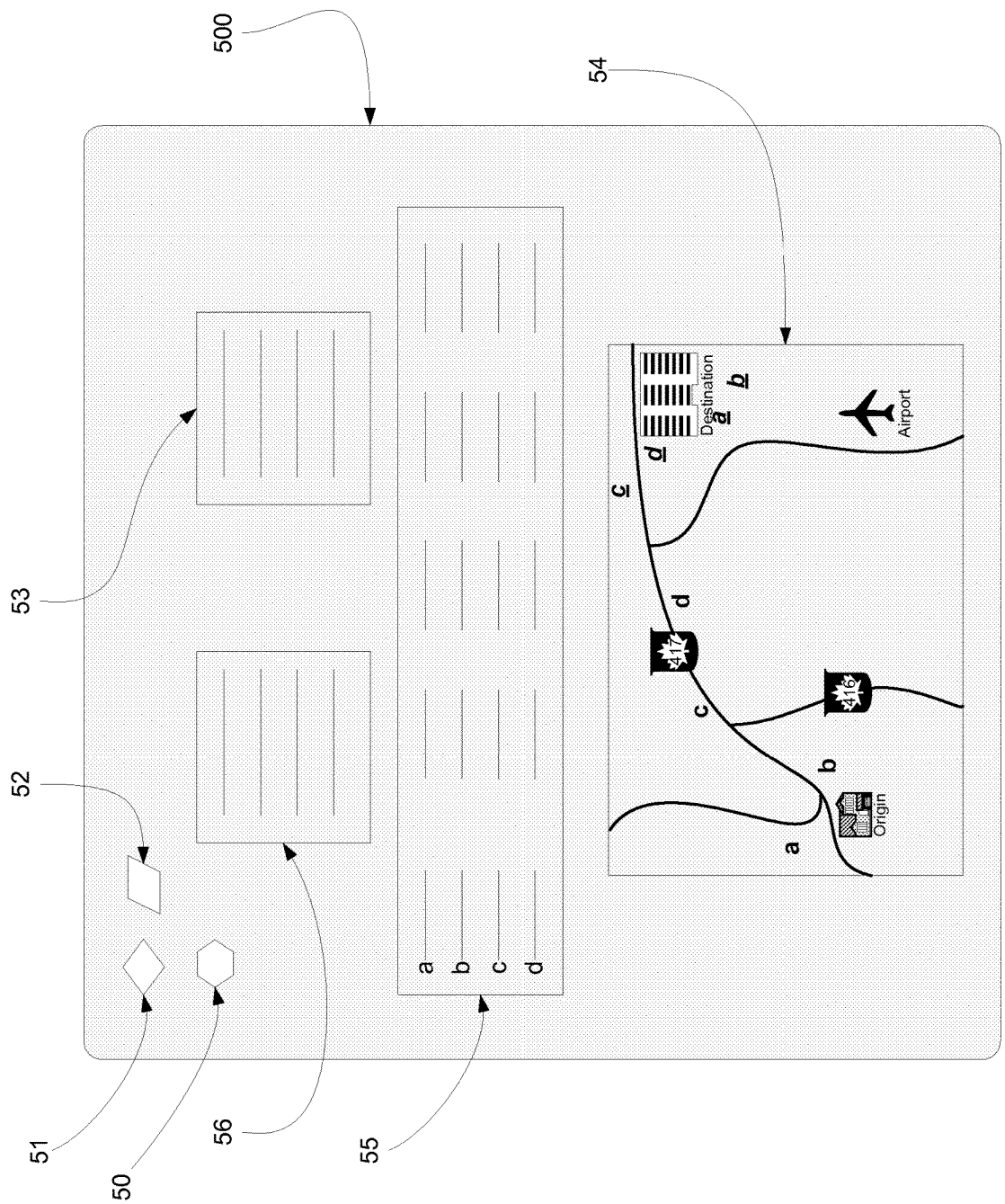
Figure 6:
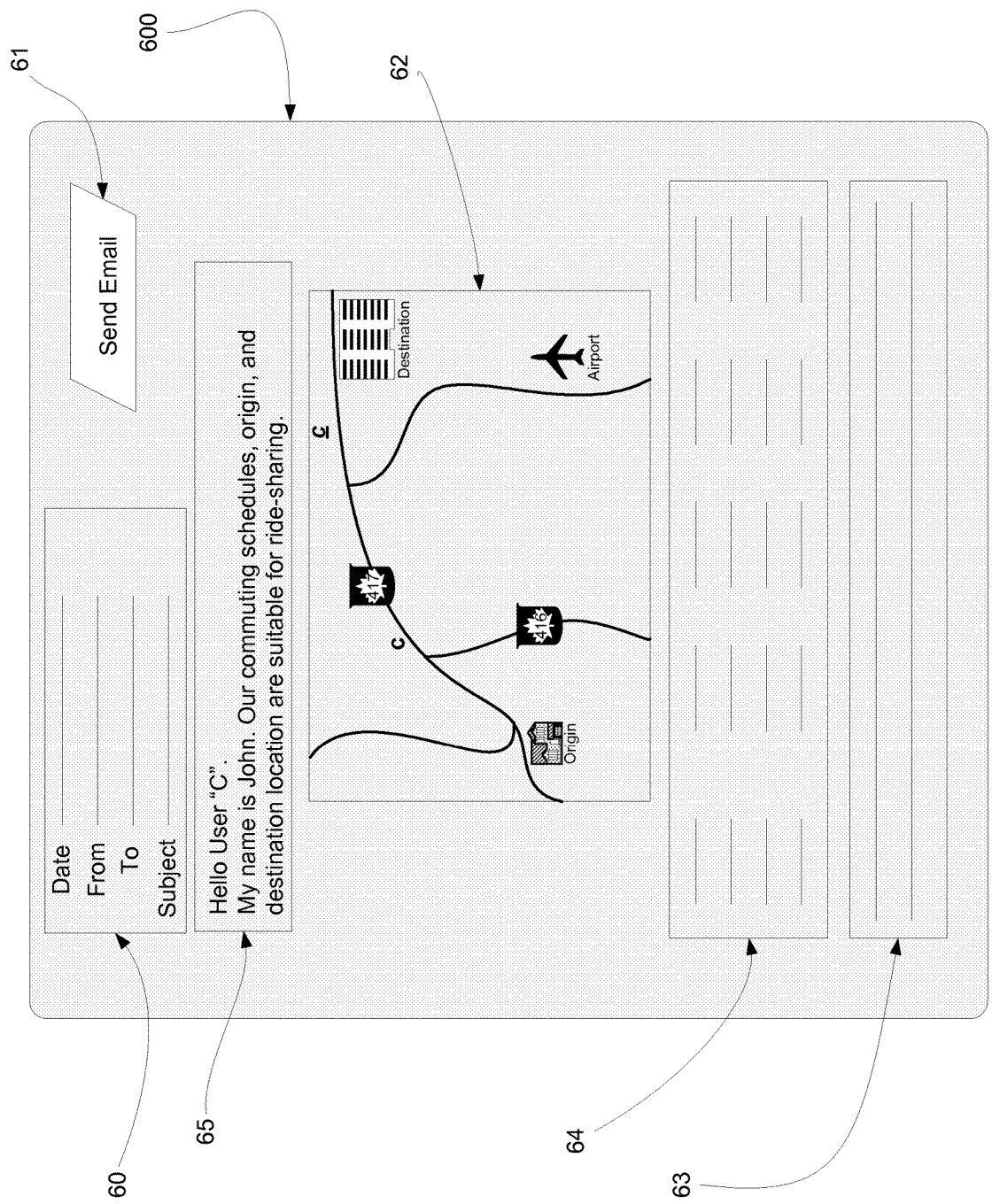

The ride match chart 55 shown in FIG. 5 includes graphical and textual information that may include the ride match's first name, gender, passenger/driver status, smoking preference, and commuting days. The final step as shown in FIG. 3 is accomplished by a "contact by email" button in the ride match chart 55 that corresponds to each ride match found. In the present example of ride matches a through d, contacting ride match c will provide the User with the Contact Matching User GUI 600. Such Contact Matching User GUI 600 includes features of most standard email interfaces including a time/date header 60 and a send button 61. However, information in the Contact Matching User GUI 600 and email generated is designed to protect the identity of both the sender and the receiver unless and until the receiver accepts the sender's invitation to ride-share. As seen in FIG. 6, the Contact Matching User GUI 600 includes a message body that has a generic introduction 65 along with a graphical map display 62 showing the receiver and sender origins and destinations. A commuting information section 64 is shown that may include the sender's profile, preferences, schedule, place of work, and nearest intersections to sender's origin and destination. As well, the Contact Matching User GUI 600 may include a text section 63 for the sender to add further text.

A specific embodiment of the present invention works in conjunction with the MapPoint Web Service® which is a programmable mapping web service hosted by Microsoft Corporation of Redmond, Wash. However, it should be understood that the underlying principles of the present invention may be utilized with any similar mapping web service without straying from the intended scope of the present invention. Indeed, the present invention may utilize a self-contained mapping module integrated into the present invention. However, for the sake of simplicity and clarity of illustration, the present embodiment will be discussed in terms of using the MapPoint Web Service®. MapPoint Web Service® is used by enterprises and independent software developers to integrate location-based services, such as maps, driving directions and proximity searches, into software applications and business processes. The MapPoint Web Service® provides various Object Oriented Programming Classes and Methods. The use of the following Classes is specifically referenced in this Patent Application for the purposes of Carpooling.

The table in FIG. 7 shows the FindNearRoute and FindNearby methods contained in the FindServiceSoap Class of the MapPoint Web Service®. The table in FIG. 8 shows the CalculateRoute and CalculateSimpleRoute methods contained in the RouteServiceSoap Class of the MapPoint Web Service®.

The CustomerDataService Class of the MapPoint Web Service® contains the methods to programmatically upload the point-of-interest data to the MapPoint servers. This patent application uses this class for the purpose of Uploading User Data (UserID, Location Info, Properties) for the use by the FindNearby and FindNearRoute Methods of the FindServiceSoap. Data can also be uploaded to the MapPoint Web Service® through manual methods that require Client-Server communication using standard client-server communication protocols such as ftp or http. It should be understood that while the "names" of the services may be changed by Microsoft Corporation, the functionality of these classes (or related classes) with respect to Car pooling forms is utilized within the present patent application. As such, several aspects of the present invention use the above-referenced features of the MapPoint Web Service®.

A first aspect of the invention includes a method and related Carpool Matching system where an individual or User provides addresses (such as Home, Origin, Destination or other locations) and the address information is either immediately, or through a scheduled batch process, uploaded to the mapping module (i.e., MapPoint Web Service® Using the CustomerDataService Class).

A second aspect of the invention includes a method and related Carpool Matching system where an individual or User provides addresses, the address information is either immediately, or at a later time, uploaded manually to the mapping module (i.e., MapPoint Web Service®) through direct Client-Server Communication Protocols such as ftp or http.

A third aspect of the invention includes a method and related Carpool Matching system where an individual or User provides addresses, the address information is either immediately geocoded by the Carpool Matching system prior to uploading to the mapping module (i.e., MapPoint Web Service®), or is geocoded by the mapping module (i.e., MapPoint Web Service®) after uploading the data points.

Further, a fourth aspect of the invention includes a method and related Carpool Matching system where a Seeker uses the system to identify Matched Users whereby the system implements the five (5) methods described below. It should be noted that methods 1, 2, 4 and 5 can be performed in different orders without straying from the intended scope of the present invention. Method 3 must be performed once 1 and 2 have been completed. The various Classes and Methods of the MapPoint Web Service® are used to illustrate this fourth aspect of the invention. However, as mentioned above, any mapping module with similar functionality to the MapPoint Web Service® may be utilized without straying from the intended scope of the present invention.

The first method in accordance with the fourth aspect of the invention includes finding other users whose Origin is within a specified distance from the Seeker's Travel Route. This method includes the steps whereby: (a) Seekers Travel Points, as defined by Origin Address, Destination Address and Waypoint Addresses (if provided) or by Global Coordinates Locations are converted to a travel route using the MapPoint Web Service® (specifically RouteServiceSoap Class); (b) the returned route is referenced by the FindNearRoute Method of the FindServiceSoap Class; (c) the MapPoint Web Service®'s FindNearRoute Method, is referenced to the Data Source Name of the data which was uploaded by one of the first, second, or third aspects of the invention described above; (d) other parameters are assigned to the FindNearRoute Method as necessary for proper functionality of the method prior to sending the FindNearRoute request; (e) parameters are set for the EntityPropertyValue property of the FindNearRouteSpecification to return only Origin points along the route; and (f) the returned array (call it Matched-Origin-To-Route-Array) represents Users whose Points of Origin lie within the specified distance from the Seeker's Travel Route.

The second method in accordance with the fourth aspect of the invention includes finding other users whose Destination Location is within a specified distance from the Seeker's Travel Route. This method includes the steps whereby: (a) Seekers Travel Points, as defined by Origin Address, Destination Address and Waypoint Addresses (if provided) or by Global Coordinates Locations are converted to a travel route using the MapPoint Web Service® (specifically RouteServiceSoap Class); (b) the returned route is referenced by the FindNearRoute Method of the FindServiceSoap Class; (c) the MapPoint Web Service®'s FindNearRoute Method, is referenced to the Data Source Name of the data which was uploaded by one of the first, second, or third aspects of the invention described above; (d) other parameters are assigned to the FindNearRoute Method as necessary for proper functionality of the method prior to sending the FindNearRoute request; (e) parameters are set for the EntityPropertyValue property of the FindNearRouteSpecification to return only Destination points along the route; and (f) the returned array (call it Matched-Destination-To-Route-Array) represents Users whose Destination Points lie within the specified distance from the Seeker's Travel Route.

The third method in accordance with the fourth aspect of the invention includes combining the first and second methods into one single Request from the RouteServiceSoap Class by employing filtering on the Carpool Matching server, rather than through use of the EntityPropertyValue property of the FindNearRouteSpecification Filter. In other words, the resultant array for the FindNearRouteMethod would contain both Origin and Destination points along the Route, and then the Carpool Matching application would separate out the matches that were origin points from the destination points. This method includes the steps whereby: (a) Seekers Travel Points, as defined by Origin Address, Destination Address and Waypoint Addresses (if provided) or by Global Coordinates Locations are converted to a travel route using the MapPoint Web Service® (specifically RouteServiceSoap Class); (b) the returned route is referenced by the FindNearRoute Method of the FindServiceSoap Class; (c) the MapPoint Web Service®'s FindNearRoute Method, is referenced to the Data Source Name of the data which was uploaded by one of the first, second, or third aspects of the invention described above; (d) other parameters are assigned to the FindNearRoute Method as necessary for proper functionality of the method prior to sending the FindNearRoute request; (e) the returned array (call it Matched-Origin-OR-Destination-To-Route-Array) represents Users whose Origin OR Destination Points lie within the specified distance from the Seeker's Travel Route; and (f) the returned array can then be split easily into two arrays to match the Matched-Origin-To-Route-Array and Matched-Destination-To-Route-Array.

The fourth method in accordance with the fourth aspect of the invention includes finding other users whose Origin is within a specified distance from the Seeker's Origin. This method includes the steps whereby: (a) Seekers' Origin Address or their respective Global Coordinate Origin are provided to the MapPoint Web Service® FindNearBy Method along with a reference to the Data Source Name of the data which was uploaded by one of the first, second, or third aspects of the invention described above; (b) other parameters are assigned to the FindNearBy Method as necessary for proper functionality of the method prior to sending the FindNearRoute request; and (c) the returned array (call it Matched-Origin-Point-Array) represents Users whose Origin Points lie within the specified distance from the Seeker's Origin Point.

The fifth method in accordance with the fourth aspect of the invention includes finding other users whose Destination is within a specified distance from the Seeker's Destination. This method includes the steps whereby: (a) Seekers' Destination Address or their respective Global Coordinate Origin are provided to the MapPoint Web Service® FindNearBy Method along with a reference to the Data Source Name of the data which was uploaded by one of the first, second, or third aspects of the invention described above; (b) other parameters are assigned to the FindNearBy Method as necessary for proper functionality of the method prior to sending the FindNearRoute request; and (c) the returned array (call it Matched-Destination-Point-Array) represents Users whose Destination Points lie within the specified distance from the Seeker's Destination Point.

Still further, a fifth aspect of the invention includes a method and related Carpool Matching system where data exists which was obtained using MapPoint FindNearBy Methods or FindNearRoute Methods and which can be processed using standard array processing methodologies to yield arrays which correspond to the following four (4) arrays: Matched-Origin-To-Route-Array, Matched-Destination-To-Route-Array, Matched-Origin-Point-Array, and Matched-Destination-Point-Array.

Yet still further, a sixth aspect of the invention includes a method and related Carpool Matching system where data exists or can be processed to exist and correspond to the Matched-Origin-To-Route-Array, Matched-Destination-To-Route-Array, Matched-Origin-Point-Array, and Matched-Destination-Point-Array so as to find Users who match one of the four (4) following categories.

Category One includes Users who match Origin and Destination Points with the Seeker. Such Users must exist in the Matched-Origin-To-Point-Array and the Matched-Destination-Point-Array.

Category Two includes Users who match Origin Point and whose Destination is along the Seeker's Route. Such Users must exist in the Matched-Origin-Point-Array and the Matched-Destination-To-Route-Array.

Category Three includes Users who match Destination Point and whose Origin is along the Seeker's Route. Such Users must exist in the Matched-Origin-To-Route-Array and the Matched-Destination-Point-Array.

Category Four includes Users whose Origin is along the Seeker's Route and also whose Destination is along the Seeker's Route. Such users must exist in the Matched-Origin-To-Route-Array and the Matched-Destination-To-Route-Array.

Still further, a seventh aspect of the invention includes a method and related Carpool Matching system where data exists, or can be processed to exist, and correspond to the Matched-Origin-To-Route-Array, Matched-Destination-To-Route-Array, Matched-Origin-Point-Array, and Matched-Destination-Point-Array and where a User Corresponds to (Category Four) Users whose Origin is along the Seeker's Route and also whose Destination is along the Seeker's Route whereby such users must exist in the Matched-Origin-To-Route-Array and the Matched-Destination-To-Route-Array. In such seventh aspect, the Travel Direction of the Matched User must match the Travel Direction of the Seeker. This is accomplished through ensuring that: (a) the Distance of (Matched User's Origin to Seeker's Origin) is LESS THAN the Distance of (Matched User's Destination to Seeker's Origin) AND (b) the Distance of (Matched User's Destination to Seeker's Destination) is LESS THAN the Distance of (Matched User's Origin to Seeker's Destination). Optionally, an addition filter can be applied to ensure that a reasonable distance exists between the User's Start & End Points compared to the Seeker's Travel Route. Such additional filter function is formed by ensuring that the Distance From Matched User's Origin to Matched User's Destination is GREATER THAN the Distance From Seeker's Origin to Seeker's Destination TIMES a given Factor (between 0% and 100% as desired).

In operation, a User is presented with a web-based interface as shown generally by FIGS. 1 through 6. The User is prompted to input data including, but not limited to, identifying information such as name, age, gender, home and/or work addresses, or employer. Additionally, personal preferences such as, but not limited to, smoker vs. non-smoker, driver vs. rider, allergies . . . etc. are entered by the User. The use of pull-down menus for populating the initial user information is possible in combination with fillable fields. Once the User provides the initial user information via the web-based interface, the Origin can be determined. This is accomplished by checking the address of the User against a database such as a postal database so as to determine with accuracy the Origin.

It should be understood that parsing of the address entered by the User may be necessary as data entry may vary among users (e.g., Smith Falls Road, Smiths Falls Rd., and Smithfalls RD). Further, the address entered by the User may involve an area of new housing construction. In such instances, the use of a mapping database (e.g., via Google or MapQuest websites) may be used or the user may be offered the option to indicate their location by clicking on a map. Once the Origin is determined, it is translated into latitudinal and longitudinal coordinates correlated to that User. An optional verification may be used in conjunction with the MapPoint Web Service®.

In system operation, it should be understood that multiple Users would be enabled to provide information and such information would be uploaded multiple times a day. Such information would therefore represent the Origins of many several Users along with their personal preferences. Such Origin data and User preferences would be assembled within the inventive system so as to be computationally-efficient using a standard relational database management system (RDBMS) with multiple indexes.

Once the relational database (or Object Oriented database) is formed, one or more Users would then use the web-based interface to set a destination. In much the same manner as setting the Origin, the User is prompted to input destination data by addresses. Once the User provides the destination address via the web-based interface, the Destination can be determined. This is accomplished by checking the destination address against a database such as a postal database so as to determine with accuracy the Destination. Again, it should be understood that parsing of the address entered by the User may be necessary as data entry may vary among users. Further, the address entered by the User may involve an area of new construction or mailbox drop areas vs. actual place of business. In such instances, the use of a mapping database (e.g., via the Google or MapQuest websites) may be used to locate the Destination. Once the Destination is determined, it is translated into latitudinal and longitudinal coordinates correlated to that Destination. As before with regard to the Origin determination, an optional verification may be used in conjunction with the MapPoint Web Service® to verify the Destination. As well, the use of pull-down menus for populating the Destination is possible in combination with Tillable fields. It should be readily apparent that pull-downs are useful for popular destinations (e.g., Eiffel Tower, Empire State Building, and Sears Tower).

Using the Origin and Destination, the inventive system will configure the driving route via the MapPoint Web Service® described hereinabove utilizing the FindRoute function. This serves to automatically order the routes simultaneously by end points (i.e., including origin latitude and origin longitude along with corresponding destination latitude and destination longitude). The User may adjust the route they have provided to the system via selection of Waypoints (i.e., points along the driving route). It should be understood that Waypoints may themselves form an end point (either origin or destination).

Once the driving route is configured, the inventive system matches Users according to their Origin's and Destination's proximity to their Travel Route. It should be understood that driving direction is taken into account during this process such that only Users traveling the same direction along the driving route are actually matched. The personal preference filters are then applied so as to customize the matched Users. This also serves to limit the number of matched Users. In some instances, the number of matched Users may be too low if all personal preference filter criteria are applied. In such instances, the User may be given the option to remove one or more of the personal preferences. Alternatively, the User may be given the option at the initial data entry stage to rank their personal preferences whereby low ranked preferences could be ignored so as to increase the probability of a ride match.

The outcome of the above process in accordance with the inventive system may include, without limitation, a displayed profile and commuting schedule such as shown in FIGS. 1 and 2, a printed schedule or itinerary, a personalized schedule or itinerary that is physically couriered or electronically mailed to the User, or any combination thereof. It should further be understood that the inventive method and system may be used over wireless (e.g., cellular, WLAN . . . etc.) as well as hard-wired media such as dial-up or DSL Internet services. It should further be understood that although the above description indicates that the invention is Internet based, the scope of the present invention applies equally to operation internal to a company/enterprise through a LAN or WAN, or VPN (i.e., a company hosts the application on their servers for private network use only). As well, the present invention can alternatively be easily modified to function as a Client Based application.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A system comprising a first server connected to a network comprising a first microprocessor, a first network interface and a first non-transitory machine-readable storage medium, the first server configured to:
   store data relating to a plurality of users registered with a transport application within a database established within the first non-transitory machine-readable storage medium;
   receive first data via the first network interface from a first electronic device associated with a first user, the first data identifying a physical origin and a physical destination corresponding to a route to be travelled by the first user;
   determine that at least one of the physical origin or the physical destination cannot be located by the first server;
   in response to determining that the at least one of the physical origin or physical destination cannot be located, receive an indication of the at least one of the physical origin or the physical destination which cannot be located by the first server via a map on a first graphical user interface;

receive second data via the first network interface from the first electronic device, the second data identifying first-user criteria related to first-user personal preferences;

receive third data via the first network interface from a second server, the third data being provided by the second server in response to a request generated by the first server, the third data being stored within a database on the second server, the third data being established in dependence upon data received by the second server from a plurality of second electronic devices identifying a second-user physical origin and a second-user physical destination corresponding to respective routes to be travelled by a plurality of second users, each of the plurality of second electronic devices being associated with a respective second user of the plurality of second users;

receive fourth data via the first network interface from the first electronic device, the fourth data establishing a user request from the first user to identify a transport sharing option;

transmit a map request to a remote programmable mapping web service in execution upon a third server connected to the network, the map request being generated by the transport application in response to the user request, the map request triggering the remote programmable mapping web service to generate and transmit to the first server a first-user travel path for the first user in dependence upon the physical origin of the first user and the physical destination of the first user;

wherein the remote programmable mapping web service geocodes the indication of the at least one of the physical origin or the physical destination which cannot be located by the first server in order to generate the first-user travel path for the first user;

receive via the first network interface from the remote programmable mapping web service the first-user travel path;

generate and store within the first non-transitory machine-readable storage medium a matched list of second users, the matched list established in dependence upon automatically matching the plurality of second users based upon a proximity of the physical origin and the physical destination of each second user of the plurality of second users to the received first-user travel path generated and transmitted by the remote programmable mapping web service and a direction of travel of each second user of the plurality of second users to a direction of travel of the first user, wherein the automatic matching is independent of any travel path between the physical origin and the physical destination of each second user of the plurality of second users other than the automatically generated first-user travel path;

generate a filtered matched list of second users by filtering said matched list of second users based upon a predetermined subset of the first-user criteria; and transmit, via the first network interface to the first electronic device associated with the first user, fifth data associated with the first user, the fifth data relating to the matched list of second users and the first-user travel path.

2. The system as claimed in claim 1, wherein the first server is further configured to:

transmit via the first network interface a second request to the second server;

retrieve, via the first network interface, sixth data from second server, the sixth data relating to second-user criteria for each of the plurality of second users, the second-user criteria relating personal preferences of each of the plurality of second users; and filtering with the first microprocessor said matched list of second users based upon said second-user criteria.

3. The system as claimed in claim 1, wherein at least one of the physical origin and the physical destination of a second user within the matched list of second users is a waypoint along said first-user travel path.

4. The system as claimed in claim 1, wherein the first electronic device is further configured to:

receive fourth inputs from the first user via the first graphical user interface, the fourth inputs relating to one or more modifications to the first-user travel path;

wherein the one or more modifications relate to the addition of one or more waypoints.

5. The system as claimed in claim 1, wherein the first server is further configured to:

automatically apply a travel schedule filter to an initial list of second users when generating the matched list of second users;

wherein the travel schedule filter comprising data relating to at least one journey of a plurality of journeys.

6. The system as claimed in claim 1, wherein generating the matched list of second users based upon the proximity of the physical origin and the physical destination of each second user of the plurality of second users to said first-user travel path comprises:

applying a first physical distance limit within which the physical origin of each second user of the plurality of second users must be to the first-user travel path; and applying a second physical distance limit within which the physical destination of each second user of the plurality of second users must be to the first-user travel path.

7. The system as claimed in claim 1, wherein at least one of:

the first-user criteria relate to a travel route filter relating to preferences for the first-user travel path; and matching the plurality of second users further comprises including a travel schedule filter relating to at least a future occurrence of making a journey from the physical origin to the physical destination.

8. The system according to claim 1, further comprising a third server comprising a fourth microprocessor, a fourth network interface, and a third non-transitory machine readable storage medium, the third server configured to:

receive sixth data via the fourth network interface from the first electronic device, the sixth data relating to selection of a selected second user by the first user within the matched list of second users; and manage electronic communications between the first user and the selected second user;

wherein an initial electronic communication from the first user to the selected second user comprises an offer to share the first user's transport using an electronic messaging address associated with the selected second user;

wherein the initial electronic communication comprises an itinerary established in dependence upon the first user, the first-user travel path, and the selected second user; and wherein identities of both the first user and the selected second user within the managed electronic communications are masked until the selected second user accepts the offer.

9. The system according to claim 1, wherein the first server when automatically matching the plurality of second users is configured to:
rank each second user, the ranking of each second user including associating each second user with one of a plurality of ranked categories according to each second user's respective rank; and
select second users from a first-rank category of the plurality of ranked categories;
wherein the first-rank category relates to second users who match the physical origin and the physical destination of the first user within predetermined limits;
wherein a second-rank category relates to second users who match the physical origin of the first user and their respective physical destinations are along the first-user travel path;
wherein a third-rank category relates to second users who match the physical destination of the first user and their respective physical origins are along the first-user travel path; and
wherein a fourth-rank category relates to second users whose respective physical origins and respective physical destinations are along the first-user travel path.

10. A method comprising:
receiving, via a graphical user interface from an electronic device associated with a first user, the first user's physical origin and physical destination in an input format, wherein the first user's physical origin or physical destination cannot be automatically located according to the input format;
presenting a map by the graphical user interface;
receiving an indication of the first user's physical origin or physical destination on the map;
converting-each of the first user's physical origin and physical destination into a standardized format, wherein converting comprises converting, using a computerized mapping service, the first user's indicated physical origin or physical destination into a standardized format;
storing information about the standardized first user's physical origin, the standardized first user's physical destination, and the first user's filter criteria relating to the first user's personal preferences in a network-based non-transitory storage device having respective standardized physical origins and respective standardized physical destinations for a plurality of other users;
receiving, from the computerized mapping service, a computer-generated travel path for the first user based on the standardized first user's physical origin and the standardized first user's physical destination;
automatically determining, by a microprocessor, whether at least one other user qualifies as a selected user,
wherein the determining of whether at least one other user qualifies as a selected user is independent of travel paths that extend from the other user's respective physical origins to the other user's respective physical destinations and that differ from the first user's travel path;
wherein the determining of whether at least one other user qualifies as a selected user is based at least in part on:
proximity of the other user's physical origin to the first user's travel path,
proximity of the other user's physical destination to the first user's travel path, and
similarity of a direction of the other user's travel to the first user's direction of travel; and
if at least one other user qualifies as a selected user:
automatically generating, by the microprocessor, a match list that includes only one or more selected users, and
automatically filtering, by the microprocessor, the match list to remove any selected user that does not satisfy the first user's filter criteria.

11. The method of claim 10, further comprising:
if at least one other user qualifies as a selected user:
the graphical user interface displays information about at least one of the one or more selected users.

12. The method of claim 11, further comprising:
if no other user qualifies as a selected user:
the graphical user interface includes a message indicating that no matching users were found.

13. The method of claim 11, further comprising:
if at least one other user qualifies as a selected user:
the graphical user interface displays a map showing at least one of the selected user's physical origin and physical destination.

14. The method of claim 10, wherein the standardized format comprises longitude and latitude coordinates.

15. The method of claim 10, wherein the first user's physical origin or physical destination comprises a new construction location or a mailbox drop area location that cannot be automatically located according to the input format.

16. The method of claim 10, wherein the graphical user interface is provided on a desktop computer.

17. A method comprising:
receiving, via a graphical user interface from an electronic device associated with a first user, the first user's physical origin and physical destination in an input format, wherein the first user's physical origin or physical destination cannot be automatically located according to the input format;
presenting a map by the graphical user interface;
receiving an indication of the first user's physical origin or physical destination on the map;
converting each of the first user's physical origin and physical destination into a standardized format, wherein converting comprises converting, using a computerized mapping service, the first user's indicated physical origin or physical destination into a standardized format;
storing the standardized first user's physical origin and the standardized first user's physical destination in a network-based non-transitory storage device having respective standardized physical origins and respective standardized physical destinations for a plurality of other users;
receiving the first user's filter criteria relating to the first user's personal preferences;
generating, using the computerized mapping service, a computer-generated travel path for the first user, the first user's travel path having been automatically generated by the computerized mapping service based on the standardized first user's physical origin and the standardized first user's physical destination;
automatically determining, by a microprocessor, whether at least one other user qualifies as a selected user,
wherein the determining of whether at least one other user qualifies as a selected user is independent of travel paths that extend from the other user's respective standardized physical origins to the other user's respective standardized physical destinations and that differ from the first user's travel path, and wherein the determining of whether at least one other user qualifies as a selected user is based at least in part on:
  proximity of the other user's standardized physical origin to the first user's travel path,
  proximity of the other user's standardized physical destination to the first user's travel path, and
  similarity of a direction of the other user's travel to the first user's direction of travel;

if at least one other user qualifies as a selected user:
  automatically generating, by the microprocessor, a match list that includes only one or more selected users;
  automatically filtering, by the microprocessor, the match list to remove any selected user that does not satisfy the first user's filter criteria; and
  transmitting to the electronic device associated with a first user, the filtered match list; and if no other user qualifies as a selected user:
  transmitting to the electronic device associated with a first user, an indication that no matches were found.

18. The method of claim 17, wherein the transmitting of the filtered match list includes transmitting display data for displaying information about at least one of the one or more selected users.

19. The method of claim 18, the transmitting of the filtered match list includes transmitting display data for displaying a map showing at least one of the selected user's physical origin and physical destination.

20. The method of claim 17, wherein the standardized format comprises longitude and latitude coordinates.

21. The method of claim 17, wherein the first user's physical origin or physical destination comprises a new construction location or a mailbox drop area location that cannot be automatically located according to the input format.

22. The method of claim 17, wherein the graphical user interface is provided on a desktop computer.

* * * * *